UNITED STATES PATENT OFFICE.

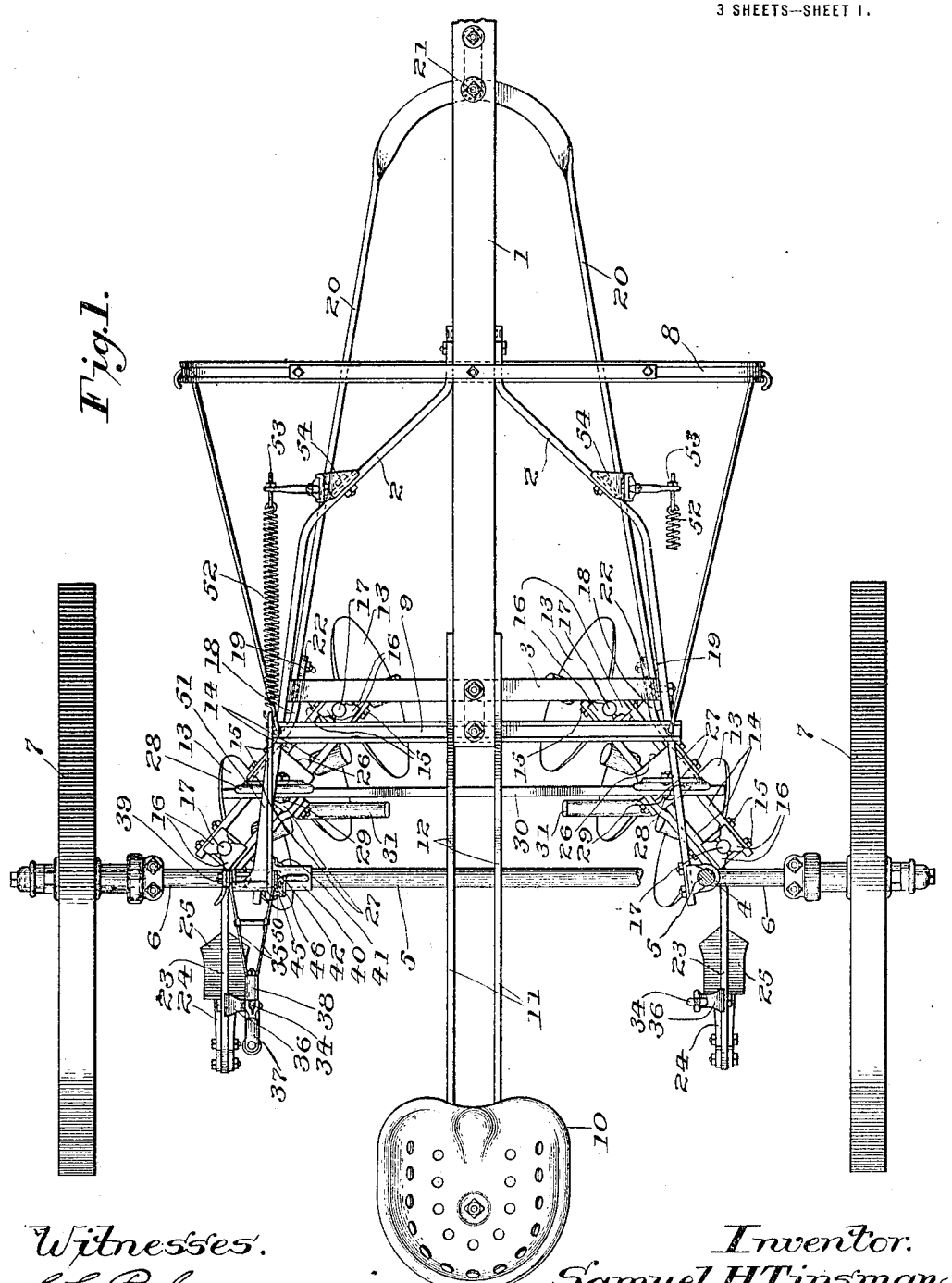

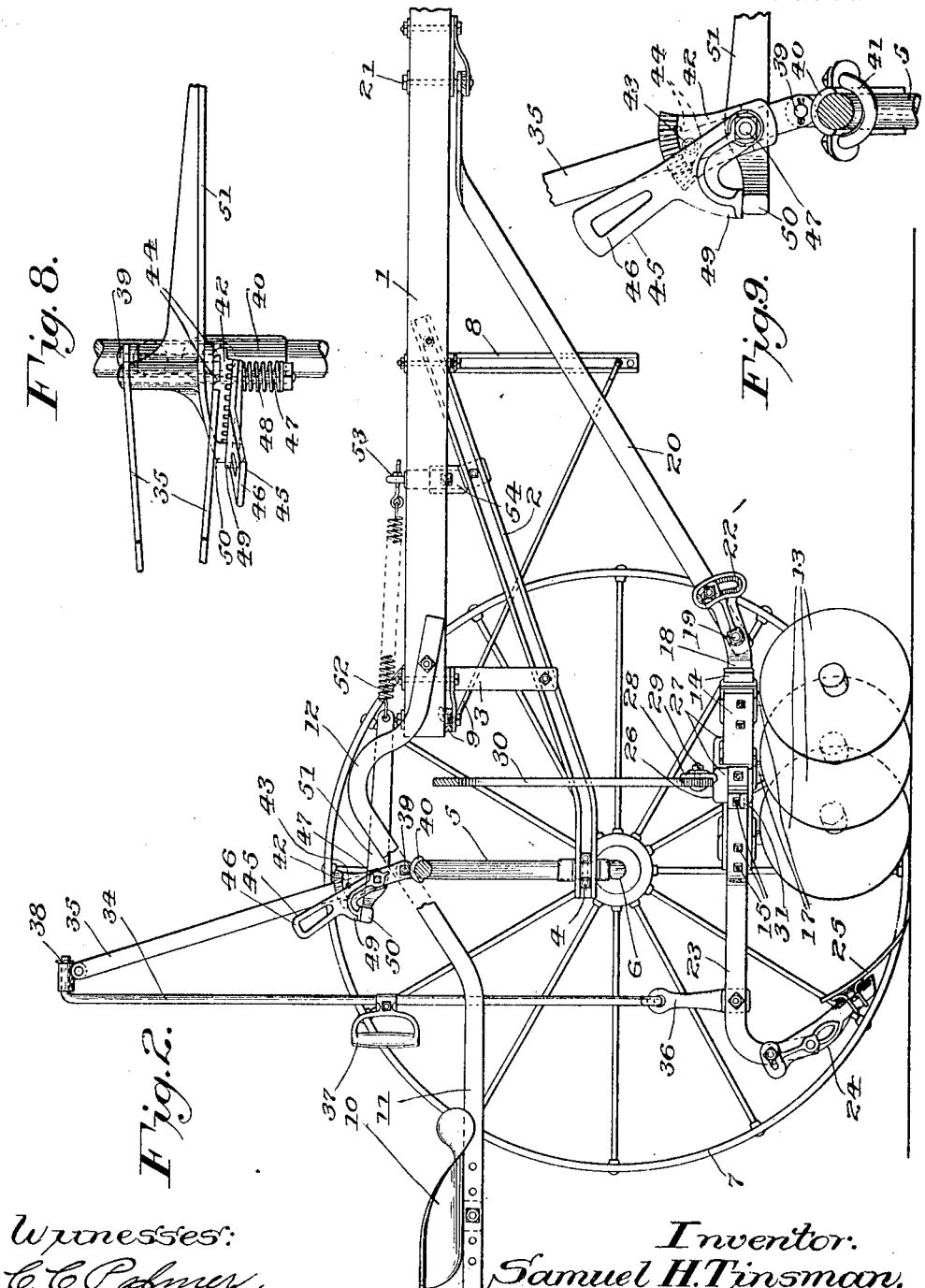

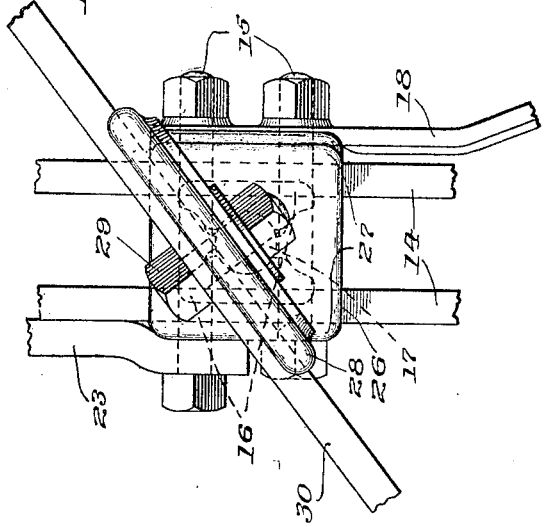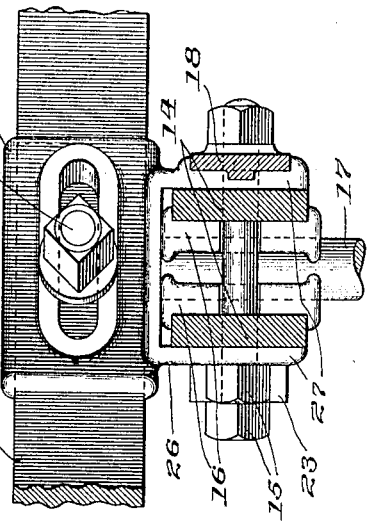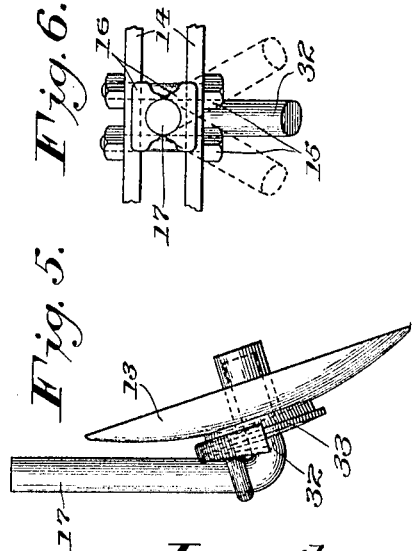

SAMUEL H. TINSMAN, OF MORRIS, ILLINOIS, ASSIGNOR, BY MESNE ASSIGNMENTS, TO INTERNATIONAL HARVESTER CORPORATION, A CORPORATION OF NEW JERSEY.

TILLAGE IMPLEMENT.

1,206,945.   Specification of Letters Patent.   Patented Dec. 5, 1916.

Application filed March 5, 1913. Serial No. 752,170.

*To all whom it may concern:*

Be it known that I, SAMUEL H. TINSMAN, a citizen of the United States, residing at Morris, in the county of Grundy and State of Illinois, have invented certain new and useful Improvements in Tillage Implements, of which the following is a full, clear, and exact specification.

My invention relates to tillage implements.

In devices of this type heretofore in use it has been necessary, in order to interchange the ground tilling members, to disconnect the gang members at the points where they are secured to the frame, necessitating in this way the provision of extra draft links or drag bars with each separate attachment, and otherwise duplicating a number of the important parts, thus adding materially to the cost of a complete cultivator equipped with a desirable number of attachments. In such cultivators the gang members proper cannot be adjusted in a vertical pivotal direction, and it, therefore, is often the case that a desirable depth of cultivation for the fore and aft ground tilling members cannot be obtained. Moreover, in such cultivators as are adapted to interchangeably receive diverse ground tilling members, the connecting elements between the beams and lifting levers are complicated and manifold, requiring a large expenditure of time to effect a substitution of parts.

The object, therefore, of this invention is the provision of a cultivator wherein the beams carrying the ground tilling members may be quickly and easily detached from the draft links and lifting levers for the purpose of substituting other and different forms of the same; to render the gang members freely adjustable in a vertical pivotal direction upon their draft links; to support the ground tilling members of such tillage implements in an improved manner, and to adjust the same in an improved manner so that their positions may be easily changed when desired with a minimum effort on the part of the operator. I attain these objects by providing novel and simple ground tilling members; improved detachable supporting means for these members, and improved means coöperating therewith for adjusting the same in all desired directions.

In order to disclose my invention, I have illustrated one embodiment of the same in the accompanying drawings, showing the same adapted for use in connection with a disk cultivator of the wheeled riding type. It is to be understood, however, that the embodiment of my invention shown herein for purposes of illustration is susceptible of modification.

Figure 1 is a top plan view of the cultivator; Fig. 2 is a side elevation of the same; Fig. 3 is a side elevation of one of the disk supports; Fig. 4 is a top plan view of the same; Fig. 5 is a detail view of one of the disk supports and bearings therefor; Fig. 6 is a detail view of a support for one of the disk standards; Fig. 7 is a side elevation of the construction shown in Fig. 4, portions of the same being shown in section; Fig. 8 is a top plan view of a portion of the mast controlling mechanism; Fig. 9 is a side elevation of the same.

The construction shown herein, when broadly considered, comprises a wheeled cultivator frame and a plurality of spaced disk gangs of improved construction supported beneath the frame and adjustable with respect thereto in a plurality of directions in an improved manner hereinafter described.

The cultivator frame includes a longitudinally disposed tongue 1 having rearwardly and outwardly extending diagonally and downwardly disposed frame members 2 attached to the opposite sides thereof and rigidly attached thereto by a depending U-shaped frame member 3. These members 2 are fixed at their lower or rear ends through U-bolt connections 4 to the bottom of the vertically extending portions of a larger U-shaped frame member 5, that has oppositely protruding horizontal extensions 6 on its lower ends forming the axles of the truck and carrying the wheels 7 thereof. As in the usual construction, suitable depending draft connections 8 are provided on the pole, a suitable equalizer connection 9 is operatively connected thereto, and a suitable seat 10 is fixed to the rear end of the pole 1 by suitable parallel rearwardly extending arms 11 in such a manner as to occupy a position beyond the rear ends of the wheels 7 and back of the pivot of the frame member 5, so that the operator, when seated in this seat, counterbalances the pole. In this connection it is to be noted that the seat supporting arms 11 are provided with upwardly extending bowed portions 12 intermediate their ends for a purpose hereinafter described.

Operatively connected to the pole are the ground tilling members or disks 13. As shown herein, these disks are spaced apart from each other and carried by a pair of horizontally disposed gang members, one of the latter being carried on each side of the line of draft, or the row to be cultivated, and having its disks so spaced and disposed with relation to each other that the ground is tilled and thrown up from one to the other toward the row to be cultivated. (Fig. 1.) Each of the disk carrying gang members extends substantially diagonally across the line of draft on opposite sides of the pole and beneath the same, and is formed of a plurality of parallel plates 14 bolted together by means of bolts 15, which serve at the same time to clamp between these plates vertically disposed spaced bearing blocks 16 for the shanks 17 of the cultivator disks 13. At substantially its middle point, and on the outer side thereof, each gang member is fixed to a forwardly and then upwardly disposed plate 18, which is pivotally connected at 19 to a forwardly and upwardly protruding diagonally disposed draft link 20. This link extends upward from the gang member, and at an angle thereto, to a point beyond the draft connections 8, where it is turned and flattened so that it may be pivotally connected at its front end to the under side of the pole or tongue 1 upon a vertically extending pivot pin 21 in such a manner that it is movable horizontally with respect to the frame, and by the provision of a sufficient clearance is also free to be adjusted vertically with respect to the latter.

Attention is further directed to the fact that each of the members is angularly adjustable bodily about its pivot 19 through an adjustable slotted locking connection 22, at one side thereof, carried on the front end of the plate 18. Upon the opposite side of each of the gang members a second plate 23 is provided, which extends parallel with one of the plates 14 thereof throughout a portion of its length, and then is protruded backward substantially parallel with the wheel 7 and bent downward substantially at right angles at its end to form a support for the shank 24 of an adjustable cultivator shovel 25, forming the outer tilling member of each gang, and acting to till the V-shaped strip of ground left by the disks in the center of each row. At a point intermediate the end of each gang member, and on the upper surface thereof, over the middle set of bearing blocks 16, a bracket 26 is seated. This bracket is preferably provided with a pair of downwardly extending parallel lugs or arms 27, one of which is grooved transversely on its outer surface to receive the inner end of the plate 18 and thus prevent angular movement of the same with respect to the gang member, and both of which are adapted to fit snugly over the plate support 14 of the gang members. Upon the top of each of these brackets 26 a diagonally disposed lug 28 is likewise provided, which is grooved on one surface and slotted longitudinally so that it may be adjustably attached by a bolt 29 to the horizontally disposed ends of an upwardly extending rigid member 30 of substantially U-shape, which extends between the gang members and connects the same together. Fixed to the inner sides of each of these brackets 26 inwardly or transversely extending foot rests 31 may be provided, as shown in Fig. 1, which protrude into such positions adjacent the center line of the machine with respect to the seat 10 that the operator may place his feet readily thereon.

It is to be noted that the plates 18 and 23 in each set, as well as the foot rest 31, are all rigidly attached together by the same bolt, certain of the other bolts 15 being used as supplemental holding means for the members 18 and 23 if desired. As shown in Figs. 3 and 6, each of the disk shanks 17 extends substantially vertically downward from the bearing members 16 and is adjustable vertically and horizontally therein upon adjustment of the bolts 15, while the lower or disk carrying end of each of these shanks 17 is provided with an integral, angularly disposed and adjustable extension 32, which is adapted to support a disk bearing 33 and the disks attached thereto in the manner described and claimed in my copending application Serial No. 752,171, filed March 5, 1913.

The adjusting mechanism for the disks 13, operable by the operator when he is seated in the seat, comprises a plurality of upwardly extending links or masts 34—35 pivotally connected to a rigid standard 36 fixed to the rear end of the plate 23 at a point adjacent the rear end of the plate 23 and substantially above the shovel 25. As shown in Fig. 2, each vertically extending mast 34 is provided with a handle 37 intermediate its ends and accessible to the operator, and at its upper end is bent over substantially at right angles to its body portion and swively connected at 38 to the diagonally disposed, upwardly extending mast 35 in such a manner that it is freely movable laterally about its pivot. The mast 35 is pivotally attached at its lower end, at 39, to a curved bracket 40, carried upon the upper bent portion of the frame member 5 and fixed thereto by a U-bolt connection 41. Upon the lower end of the mast 35 a serrated locking plate 42 is attached by a rivet 43 and positioned against angular movement with respect to the mast by parallel spaced locking lugs 44. This plate 42 is movable with the mast 35 about its pivot 39, and coöperates with a locking member 45, having a handle 46, in a manner to determine the amount of angular movement permitted the same. As shown in Fig. 9, this locking member 45 is pivotally attached at 47 to the mast 35 at a point adjacent its pivot 39, and above the latter, while, as shown in Fig. 8, this locking member is normally held in locking engagement with the plate 42 by a coiled spring 48 carried upon the outer end of the pin 47. Coöperating with a downwardly extending lug 49, preferably formed integral with the member 45, is an inturned lug or arm 50 formed integral with a pivoted member 51, pivoted at 47, and having its front end connected to a longitudinally extending spring 52, whose outer end is adjustably attached at 53 to a bracket 54 carried by one of the frame members 2.

The operation of the construction shown is as follows: Assuming that the parts are in the position shown in Fig. 2, let us assume that the operator desires to increase the depth of cultivation. To accomplish this object it is only necessary for him to pull out the member 45 to unlock the same from the locking member 42, and then throw it forward in a clockwise direction to the desired position. When this is done the mast 35 is free to move farther backward so that the disks may cultivate the ground to a greater depth. Obviously, one or both of the gangs may be so adjusted as to cultivate the ground at the same or different depths, and upon a reverse adjustment the depth of cultivation may be lessened. Should the operator desire at any time to increase the depth of cultivation without this adjustment, it is only necessary for him to exert a downward pressure upon one or both of the foot rests 31 to accomplish this result, since through the resilient support of the mast 35, the spring 52 will permit the disks 13 to move downward to the desired degree. Obviously, as soon as the pressure upon the foot rest is removed, however, this spring will return the disks to their normal position; the spring tending always to maintain a predetermined uniform depth of cultivation. Should the operator desire to adjust the disks horizontally, this may be readily accomplished by throwing one or both of the handles 37 and the connected mast or masts 34 in the desired direction about its pivot to its coöperating mast. It is here to be noted that, due to the rigid connection of the two gangs, the same are moved simultaneously in a horizontal direction so that a fixed distance between the same is always maintained, and the operator, by manipulating one set of masts, may simultaneously move both sets of gangs.

In my improvement the disk gangs are further movable in a vertical direction with a minimum of effort, due to the pivotal connection provided and the action of the spring, the operator only being required to raise the gangs until the mast 35 passes over its pivot. Attention is further directed to the fact that not only can the operator adjust the machine permanently or temporarily to cultivate at different depths while seated on the machine; but he may, when desired, obtain an additional range of adjustment by so adjusting the gangs, or the disks therein with respect to the frame and the gang members, respectively, when the machine is at rest, as to vary the depth of cultivation, and also the relation of the disks to each other.

Attention is further directed to the fact that the gang members may be moved bodily toward or away from each other on the connecting U-shaped member so that the space between the same may be adjusted as desired, and that the U-shaped member is so disposed that it in no way interferes with the use of the foot rest by the operator or the free movement of the gangs. In this connection it is also to be noted that the construction shown is exceedingly simple and rugged and of a type which may be readily and cheaply manufactured.

When it is desired to disconnect the disk gangs shown herein and substitute tilling members of a different type, it is only necessary to remove the bolts 19 and unhook the link 34 from the standard 36, whereupon the disk gangs are freely removable. By this arrangement the gang members may be constructed of a minimum number of parts, lessening their cost of manufacture and rendering them simple and compact for shipping and storing purposes. In this way no duplication of parts is necessary in fitting out a cultivator with a plurality of diverse gang members, and I am enabled thereby to provide a versatile cultivator at a minimum cost. The gang members, it will be noted, are each of a unit construction, yet at the same time the disks are independently adjustable in all directions. The gangs being thus formed as a unit, and connected to the ends of the draft links, as shown, provision is made thereby for bodily adjustment in a vertical pivotal direction through the slotted connection 22, and thus a proper working position of the disks may be obtained exactly as desired. The diagonal arrangement of the disk gangs insures uniformity in the line of draft and the independent adjustment of each disk permits the dish thereof to be regulated to suit all requirements.

While I have described in this application one embodiment of my invention, it is to be understood that the form shown herein is susceptible of modification without departing from the spirit of my invention.

What I claim as my invention, and desire to secure by Letters Patent, is:

1. In a cultivator, a frame, draft links carried on said frame, a diagonally disposed unit gang member secured to each of said draft links, a plurality of independently adjustable disks carried on said gang member, and a shovel associated with each of said gang members and carried in the rear thereof.

2. In a cultivator, a frame, draft links thereon, parallel bars spaced apart and carrying a plurality of bearing blocks therebetween secured to each of said draft links, a disk shank carried in each of said blocks, and a rearwardly extending tooth carrying bar connected with one of said parallel bars.

In testimony whereof I affix my signature, in the presence of two witnesses.

SAMUEL H. TINSMAN.

Witnesses:
F. W. HOFFMEISTER,
H. L. ROCKWELL.

Copies of this patent may be obtained for five cents each, by addressing the "Commissioner of Patents, Washington, D. C."